(12) United States Patent
Bertozzi et al.

(10) Patent No.: US 6,743,871 B2
(45) Date of Patent: Jun. 1, 2004

(54) METHOD FOR POLYMERISING ETHYLENE

(75) Inventors: Giuliano Bertozzi, Rosignano Solvay (IT); Fabian Siberdt, Brussels (BE)

(73) Assignee: Solvay Polyolefins Europe-Belgium(S.A.), Brussels (BE)

( * ) Notice: Subject to any disclaimer, the term of this patent is extended or adjusted under 35 U.S.C. 154(b) by 0 days.

(21) Appl. No.: 10/258,538

(22) PCT Filed: Feb. 27, 2002

(86) PCT No.: PCT/EP02/02140
§ 371 (c)(1),
(2), (4) Date: May 5, 2003

(87) PCT Pub. No.: WO02/068483
PCT Pub. Date: Sep. 6, 2002

(65) Prior Publication Data
US 2003/0176604 A1 Sep. 18, 2003

(30) Foreign Application Priority Data
Feb. 28, 2001 (IT) ..................... MI2001A0405

(51) Int. Cl.⁷ .................................. C08F 4/44
(52) U.S. Cl. ................ 526/127; 526/74; 526/128; 526/129; 526/234; 526/236
(58) Field of Search ............... 526/127, 128, 526/129, 234, 236, 74

(56) References Cited

FOREIGN PATENT DOCUMENTS

| | | |
|---|---|---|
| DE | 198 33 170 A1 | 1/2000 |
| EP | 0 107 127 A1 | 5/1984 |
| EP | 0107127 A1 * | 5/1984 |
| EP | 0 535 230 A1 | 4/1993 |
| EP | 0 685 495 A1 | 12/1995 |
| EP | 0685495 A1 * | 12/1995 |
| EP | 0 803 514 A1 | 10/1997 |

* cited by examiner

Primary Examiner—William Cheung
(74) Attorney, Agent, or Firm—Finnegan, Henderson, Farabow, Garrett and Dunner, L.L.P.

(57) ABSTRACT

The invention concerns a method for producing ethylene homopolymers or copolymers comprising at least 90 mol % of units derived from ethylene which consists in: contacting in polymerising conditions, the monomers with a catalytic system including: (a) a catalytic solid comprising a metallocene of a transition metal of groups 4 to 6 of the periodic table containing at least a cyclopentadiene ligand capable of being substituted and a support, (b) at least an organoaluminium compound selected among compounds of general formula (1): $AlT_x(Y')_yX'_z$ wherein: T is a hydrocarbon group containing 1 to 30 carbon atoms; Y' is a group selected among —OR', —SR' and NR'R" with R' and R" independently representing a hydrocarbon group containing 1 to 30 carbons atoms; X' is a halogen atom: x verifies the relationship $0<x\leq3$; y verifies the relationship $0\leq y<3$; z verifies the relationship $0\leq z<3$, and $x+y+z=3$, and (c) at least an ionic antistatic agent.

8 Claims, No Drawings

METHOD FOR POLYMERISING ETHYLENE

The present invention relates to a process for polymerizing ethylene.

It is known to polymerize ethylene by means of metallocene catalysts. Such processes result in the manufacture of polyethylenes having a low bulk density (BD).

Moreover, the use of antistatic agents in industrial polymerization processes is well known. These antistatic agents reduce electrical charges and thus prevent the formation of agglomerates and of deposits on the walls of the polymerization reactors. Patent applications WO 99/61486 and WO 96/11960 disclose processes for polymerizing ethylene using a supported metallocene, an aluminoxane, a trialkylaluminum and a nonionic antistatic agent chosen from diethoxylated tertiary alkylamines, which do not cause coating. Patent application EP 0 803 514 discloses a process for (co)polymerizing propylene using a supported metallocene catalyst, an aluminoxane, a trialkylaluminum and an ionic antistatic agent, which does not cause coating nor the formation of agglomerates.

A process has now been discovered for polymerizing ethylene which makes it possible to obtain polyethylenes of high bulk density with a high catalytic activity and without the walls of the reactor being fouled.

For this purpose, the present invention relates to a process for manufacturing ethylene homopolymers or ethylene copolymers comprising at least 90 mol % of units derived from ethylene, in which process ethylene, and optionally the other monomers, are brought into contact, under polymerizing conditions, with a catalytic system comprising:

(a) a catalytic solid comprising a metallocene of a transition metal of Groups 4 to 6 of the Periodic Table, which contains at least one cyclopentadiene ligand, possibly substituted, deposited on a support;

(b) at least one organoaluminum compound chosen from compounds satisfying the general formula (1)

$$AlT_x(Y')_yX'_z \qquad (1)$$

in which:

T is a hydrocarbon group containing from 1 to 30 carbon atoms,

Y' is a group chosen from —OR', —SR' and NR'R", where R' and R" represent, independently, a hydrocarbon group containing from 1 to 30 carbon atoms, X' is a halogen atom, x is a number satisfying the condition 0<x≦3, y is a number satisfying the condition 0≦y<3, z is a number satisfying the conditions 0≦z<3 and x+y+z=3; and (c) at least one ionic antistatic agent.

According to the present invention, the expression "process for polymerizing ethylene" is understood to mean a process for manufacturing ethylene homopolymers and ethylene copolymers comprising at least 90 mol % of units derived from ethylene. The preferred copolymers are those of ethylene with another alpha-olefin comprising from 3 to 8 carbon atoms. Particularly preferred are ethylene/1-butene and/or ethylene/1-hexene copolymers.

The metallocene used in the process according to the present invention is usually chosen from compounds satisfying the formula $$Q_a(C_5H_{5-d-b}R^1{}_b)(C_5H_{5-d-c}R^2{}_c)MeXY \qquad (2)$$

in which:

Q represents a divalent linking group between the two cyclopentadiene ligands $(C_5H_{5-d-b}R^1{}_b)$ and $(C_5H_{5-d-c}R^2{}_c)$;

a equals 0 or 1;

b, c and d are integers satisfying the conditions 0≦b≦5, 0≦c≦5 and 0≦d≦5 when a equals 0, and 0≦b≦4, 0≦c≦4 and 0≦d≦4 when a equals 1;

$R^1$ and $R^2$ each represent hydrocarbon groups containing from 1 to 20 carbon atoms and able to be linked to the cyclopentadiene ring in the form of a monovalent group or able to be connected to each other so as to form a ring adjacent to the cyclopentadiene ring, halogen atoms, alkoxy groups having from 1 to 12 carbon atoms, silicon-containing hydrocarbon groups of formula $—Si(R^4)(R^5)(R^6)$, phosphorus-containing hydrocarbon groups of formula $—P(R^4)(R^5)$, nitrogen-containing hydrocarbon groups of formula $—N(R^4)(R^5)$ or boron-containing hydrocarbon groups of formula $—B(R^4)(R^5)$ in which $R^4$, $R^5$ and $R^6$ represent hydrocarbon groups containing from 1 to 24 carbon atoms, as long as when b, c or d equals 2 or more and/or a plurality of groups $R^1$ or $R^2$ exist, the latter may be identical or different;

Me represents a transition metal of Groups 4 to 6 of the Periodic Table; and

X and Y, which are identical or different, each represent a hydrogen atom, a halogen atom, a hydrocarbon group, an alkoxy group, an amino group, a phosphorus-containing hydrocarbon group or a silicon-containing hydrocarbon group having from 1 to 20 carbon atoms.

The preferred transition metal compounds of formula (2) are generally such that:

Q represents an alkylene group containing 1 or 2 carbon atoms, possibly substituted with alkyl or aryl groups containing from 1 to 10 carbon atoms, or a dialkylgermanium or dialkylsilicon group containing from 1 to 6 carbon atoms;

a equals 0 or 1;

b, c and d are integers satisfying the conditions 0≦b≦5, 0≦c≦5 and 0≦d≦5 when a equals 0, and 0≦b≦4, 0≦c≦4 and 0≦d≦4 when a equals 1;

$R^1$ and $R^2$ represent alkyl, alkenyl, aryl, alkylaryl, alkenylaryl or arylalkyl groups containing from 1 to 20 carbon atoms, it being possible for several groups $R^1$ and/or several groups $R^2$ to be linked to each other so as to form a ring containing from 4 to 8 carbon atoms;

Me is zirconium, hafnium or titanium; and

X and Y represent halogen atoms or hydrocarbon groups chosen from alkyls, aryls and alkenyls containing from 1 to 10 carbon atoms.

Particularly preferred are metallocenes of formula (2) in which Q is a linking group chosen from dimethylsilyl and diphenylsilyl, ethylene and methylenes and ethylenes substituted with alkyl or aryl groups containing from 1 to 8 carbon atoms. Particularly suitable compounds of formula (2) are compounds in which the ligands $(C_5H_{5-d-b}R^1{}_b)$ and $(C_5H_{5-d-c}R^2{}_c)$ are chosen from cyclopentadienyls, indenyls and fluorenyls, these possibly being substituted. The catalytic solid (a) usually also includes an activator. The activator is generally chosen from aluminoxanes and ionizing agents.

The term "aluminoxanes" is understood to mean compounds satisfying the formula $R^7—(AlR^7—O)_m—AlR^7_2$ and the cyclic compounds satisfying the formula $(—AlR^7—O—)_{m+2}$ in which m is a number from 1 to 40 and $R^7$ is an alkyl or aryl group containing from 1 to 12 carbon atoms. The preferred compounds are chosen from methylaluminoxanes, ethylaluminoxanes, isobutylaluminoxanes and mixtures thereof, and more particularly those in which m is a number from 2 to 20. Most particularly preferred is methylaluminoxane (MAO) in which m is a number from 10 to 18.

The term "ionizing agents" is understood to mean compounds comprising a first part which has the properties of a Lewis acid and is capable of ionizing the metallocene and a second part which is inert with respect to the ionized metallocene and is capable of stabilizing it. As examples of such compounds, mention may be made of triphenylcarbenium tetrakis(pentafluorophenyl)borate, N,N-dimethylanilium tetrakis(pentafluorophenyl)borate, tri(n-butyl)ammonium tetrakis(pentafluorophenyl)borate, tri (pentafluorophenyl)boron, triphenylboron, trimethylboron, tri(trimethylsilyl)boron and organoboroxines.

The amount of activator in the catalytic solid depends on the type of activator used. When the activator is an aluminoxane, the amount of aluminoxane is usually such that the atomic ratio of aluminum coming from the aluminoxane to the transition metal coming from the metallocene is from 2 to 5000. Preferably, this ratio is at least 5, more particularly at least 10. Good results are obtained when this ratio is at least 20. Usually the aluminoxane is employed in amounts such that the aluminum/transition metal atomic ratio is at most 2000, more particular at most 1500. Atomic ratios of aluminum coming from the aluminoxane of [sic] the transition metal of at most 1000 are most particularly preferred. Ratios of at most 300 give good results. When the activator is an ionizing agent, the amount of ionizing agent is usually such that the molar ratio of the ionizing agent to the metallocene is from 0.05 to 50. Preferably, this ratio is at least 0.1 and more particularly at most 20.

The catalytic solid (a) contains a support. The support may be any known organic or inorganic support allowing the metallocene and possibly the activator to be supported. As nonlimiting examples of inorganic supports, mention may be made of talc or inorganic oxides-such as silicas, aluminas, titanium, zirconium or magnesium oxides, or mixtures thereof. Such supports have been disclosed in patent application EP 0 206 794 for example. The organic supports are usually chosen from among porous polymeric supports, and more particularly from among polyolefin supports such as those disclosed in patent application EP 1 038 883. Inorganic supports are preferred within the context of the present invention. Silica is particularly preferred.

The catalytic solid (a) used in the process according to the invention may be obtained by various methods. In general, support particles are brought into contact with a solution containing the activator in order to obtain a suspension which is then evaporated. The metallocene may be introduced into the suspension described above. It may also have been incorporated into the support before it is brought into contact with the activator. Finally, it may be brought into contact with the support particles containing the activator.

The catalytic solid (a) employed in the process according to the present invention generally contains from 0.001 to 5 g of metallocene per gram of support. Preferably, the concentration of metallocene is at least 0.005 g and more particularly at least 0.01 g per gram of support. Amounts of metallocene less than or equal to 3 and preferably less than or equal to 1 g per gram of support give good results.

According to a variant of the process according to the invention, a catalytic solid (a) is used that has been subjected to a preliminary polymerization during which it is brought into contact with an alpha-olefin, under polymerizing conditions, so as to form from 0.01 to 50 g of polyolefin per g of catalytic solid. The alpha-olefin used during the preliminary polymerization step is advantageously chosen from among alpha-olefins containing from 2 to 4 carbon atoms.

The catalytic system also includes at least one organoaluminum compound (b) satisfying the general formula (1). The organoaluminum compound is preferably chosen from among trialkylaluminums of formula $AlT_3$, and more particularly from among those in which each T represents, independently, an alkyl group containing from 1 to 20 carbon atoms. Particularly preferred is a trialkylaluminum in which T is an alkyl group containing from 1 to 6 carbon atoms, such as trimethylaluminum (TMA), triethylaluminum and triisobutylaluminum (TIBAL).

The amount of organoaluminum compound (b) employed in the process according to the invention is in general such that the atomic ratio of the aluminum coming from the organoaluminum compound (b) to the transition metal coming from the metallocene is from 10 to 50 000. Preferably, this ratio is at least 20, more particularly at least 30. Goods results are obtained when this ratio is at least 40. Usually the organoaluminum compound (b) is employed in amounts such that the aluminum coming from the organoaluminum compound/transition metal coming from the metallocene atomic ratio is at most 20 000 and more particularly at most 17 000. Ratios of at most 15 000 give good results.

The catalytic system used in the process according to the invention also includes at least one ionic antistatic agent (c). Within the context of the present invention, the ionic antistatic agents are generally chosen from among those containing a long hydrophobic chain. Preferably, ionic antistatic agents comprising at least one hydrocarbon group containing from 6 to 35 carbon atoms is used, this group being possibly substituted.

According to a first variant of the process according to the invention, the antistatic agent is chosen from among cationic antistatic agents and more particularly from among quaternary ammonium salts represented by the general formula $A^1A^2A^3A^4NX^1$ in which $A^1$, $A^2$, $A^3$ and $A^4$ represent, independently, a hydrocarbon group containing from 1 to 35 carbon atoms and at least one of $A^1$, $A^2$, $A^3$ and $A^4$ is a hydrocarbon group containing from 6 to 35 carbon atoms, and $X^1$ is a halogen atom. Quaternary alkylammonium salts containing at least one alkyl group containing from 6 to 35 carbon atoms are preferred. Quaternary alkylammonium salts containing at least one alkyl group containing from 6 to 35 carbon atoms derived from a fatty acid give good results. As a nonlimiting example of a quaternary ammonium salt, mention may be made of dicocoalkyldimethylammonium chloride. The product commercially available under the name CHEMAX® X-997 is particularly preferred.

According to a second variant of the process, the antistatic agent is chosen from among anionic antistatic agents and more particularly from among sulfonic acids comprising at least one hydrocarbon group containing from 6 to 35 carbon atoms, this group possibly being substituted. Sulfonic acids comprising a hydrocarbon group, preferably an aryl group, containing from 6 to 18 carbon atoms and substituted with at least one alkyl group containing from 6 to 16 carbon atoms give good results. As a nonlimiting example of a sulfonic acid, mention may be made of dinonylnaphthalenesulfonic acid. The product sold by the company Octel under the name STADIS® 450 is particularly preferred.

The amount of antistatic agent employed in the process according to the invention is in general such that the molar ratio of the antistatic agent (c) to the organoaluminum compound (b) is less than 0.5. Preferably, the molar ratio of the antistatic agent to the organoaluminum compound is less than 0.2. Molar ratios of less than 0.1 are particularly preferred. The amount of antistatic agent is such that the molar ratio of the antistatic agent (c) to the organoaluminum compound (b) is in general at least 0.001. Preferably, this molar ratio is at least 0.002, more particularly at least 0.003.

In the process according to the invention, it is advantageous to prepare a premixture comprising at least the organoaluminum compound (b) and the antistatic agent (c), before the catalytic solid (a) is added thereto.

The polymerization process according to the invention may be carried out continuously or batchwise, by whatever known process. The polymerization process is preferably carried out in suspension in a hydrocarbon diluent. The hydrocarbon diluent is generally chosen from among aliphatic hydrocarbons containing from 3 to 10 carbon atoms. Preferably, the diluent is chosen from among propane, isobutane, hexane or mixtures thereof.

The temperature at which the polymerization process according to the invention is carried out is generally from $-20°$ C. to $+150°$ C., usually from 20 to 130° C. The polymerization temperature is preferably at least 60° C. Preferably, it does not exceed 115° C.

The total pressure at which the process according to the invention is carried out is in general chosen to be between atmospheric pressure and $100 \times 10^5$ Pa, more particularly between $10 \times 10^5$ and $55 \times 10^5$ Pa.

The molecular mass of the polymers manufactured according to the process of the invention may be controlled by addition of one or more agents for controlling the molecular mass of polyolefins, such as more particularly hydrogen.

In a variant of the process according to the invention, the process comprises a first polymerization step, separate from the preliminary polymerization step (described above in relation to the catalytic solid) and called prepolymerization step, during which from 1 to 1000 g of polymer per g of catalytic solid are formed. The amount of prepolymer formed in this prepolymerization step is advantageously at least 3 g per g of catalytic solid. Good results are obtained when the amount of prepolymer is at most 700 g per g of catalytic solid. In general, the prepolymerization step is carried out at a temperature from 0 to 60° C.

The process according to the invention makes it possible to obtain catalytic activities considerably higher than in the process with no ionic antistatic agent, without the walls of the reactor being fouled, while at the same time giving polyethylenes having a higher bulk density (BD). Obtaining polymers having high BDs has the advantage of increasing the production capability of polymerization plants and of increasing storage and transport capabilities.

The following examples serve to illustrate the invention. The methods for measuring the parameters mentioned in the examples and the units expressing these parameters will be explained below.

The catalytic activity is characterized by the amount of polyethylene formed during polymerization trials and is expressed in kg of polyethylene per mmol of transition metal coming from the metallocene employed, per hour of polymerization and per $10^5$ Pa. In examples 10 to 13R, the catalytic activity is assessed indirectly from the determination by gas chromatography of the residual ethylene in the gas leaving the reactor.

The BD of the polyethylene obtained is expressed in $kg/m^3$. The BD of the polyethylene is measured under free flow using the following operating method: the polyethylene coming from the polymerization process is poured into a cylindrical container of 50 $cm^3$ capacity, taking care not to compact it, from a hopper whose lower edge is placed 20 mm above the upper edge of the container. The container filled with the powder is then weighed, the tare is deducted from the recorded weight and the result obtained, expressed in kg, is multiplied by 20 000 so as to express the BD in $kg/m^3$.

In examples 1 to 9R, the concentration of antistatic agent is expressed in ppm with respect to isobutane.

EXAMPLES 1 AND 2

1.8 mmol of TIBAL, the antistatic agent (dicocoalkyldimethylammonium chloride sold under the name CHEMAX® X-997 or dinonylnaphthalenesulfonic acid sold under the name STADIS® 450 by Octel) (dissolved in hexane) and 1800 ml of isobutane were introduced, with dry nitrogen purging, into a dry 5-liter autoclave fitted with a stirrer.

The temperature was increased up to 80° C. and ethylene was added so as to obtain an ethylene partial pressure of $10 \times 10^5$ Pa.

The polymerization was started by sending the catalytic solid, comprising 6% by weight of ethylenebis(4,5,6,7-tetrahydro-1-indenyl)zirconium dichloride and 47.5% by weight of MAO (corresponding to 22.1% by weight of aluminum), onto a silica support with 200 ml of isobutane.

The temperature and the ethylene partial pressure were kept constant throughout the duration of polymerization (1 hour). The reaction was stopped by degassing and cooling the reactor. The polyethylene was recovered by draining the reactor and was dried.

The polymerization conditions and the results obtained are given in table 1. In no case was coating of the reactor observed.

TABLE 1

| Ex. | Catalytic solid (mg) | Antistatic agent Type | ppm | Activity | BD |
|---|---|---|---|---|---|
| 1 | 63 | Chemax ® X-997 | 20 | 44 | 342 |
| 2 | 63 | Stadis ® 450 | 20 | 46 | 352 |
| 3R | 66 | — | — | 39 | 229 |

EXAMPLE 3R (NOT ACCORDING TO THE INVENTION)

The operations of example 1 were repeated, but without adding antistatic agent. The results obtained are also given in table 1.

This shows that the addition of an ionic antistatic agent makes it possible to obtain, with a better yield, polyethylenes having a higher BD.

EXAMPLES 4 TO 8

0.9 mmol of TIBAL and 800 ml of isobutane were introduced, with dry nitrogen purging, into a dry 3-liter autoclave fitted with a stirrer.

The temperature was increased up to 80° C. and hydrogen was added so as to obtain the desired $H_2$/ethylene molar ratio in the gas phase. Next, ethylene was introduced until an ethylene partial pressure of $10 \times 10^5$ Pa was obtained.

The antistatic agent (CHEMAX® X-997 or STADIS® 450 from Octel) (dissolved in hexane) was sent to the reactor with 100 ml of isobutane, and the polymerization was started by sending the catalytic solid as described in example 1, with 100 ml of isobutane.

The temperature, ethylene partial pressure and $H_2$/ethylene ratio were kept constant throughout the duration of polymerization (1 hour). The reaction was stopped by cooling and degassing the reactor. The polyethylene was recovered by draining the reactor and was dried.

The polymerization conditions and the results obtained are given in table 2. In no case was coating of the reactor observed.

TABLE 2

| Ex. | Catalytic solid (mg) | $H_2$/ethylene (mol/mol) | Antistatic agent Type | ppm | Activity |
|---|---|---|---|---|---|
| 4 | 154 | 0.0021 | Chemax ® X-997 | 10 | 20 |
| 5 | 155 | 0.0020 | Chemax ® X-997 | 20 | 26 |
| 6 | 152 | 0.0023 | Chemax ® X-997 | 40 | 25 |
| 7 | 148 | 0.0022 | Stadis ® 450 | 25 | 18 |
| 8 | 149 | 0.0021 | Stadis ® 450 | 50 | 25 |
| 9R | 153 | 0.0023 | — | — | 13 |

EXAMPLE 9R (NOT ACCORDING TO THE INVENTION)

The operations of example 6 were repeated, but without adding antistatic agent. The results obtained are given in table 2. Table 2 shows that the addition of an antistatic agent makes it possible to increase the catalytic activity considerably.

EXAMPLE 10

Isobutane, ethylene, hydrogen, TIBAL, CHEMAX® X-997 and the catalytic solid, described in example 1, were continuously introduced into a loop reactor. The polymerization conditions are given in table 3. The suspension comprising the polyethylene was continuously removed from the reactor and subjected to reduced pressure so as to evaporate the isobutane, the hydrogen and the ethylene so as to recover the polyethylene in the form of a powder, which was then dried. The ethylene content in the gas leaving the reactor was 12.2 mol %.

After 15 days of continuous polymerization, the reactor was stopped and inspected. The reactor was free of coating.

TABLE 3

| | Ex. 10 | Ex. 11R | Ex. 12 | Ex. 13R |
|---|---|---|---|---|
| Chemax ® X-997 (g/h) | 0.468 | 0 | 0 | 0 |
| Stadis ® 450 (g/h) | 0 | 0 | 0.33 | 0 |
| TIBAL (g/h) | 13.0 | 13.0 | 13.5 | 13.4 |
| $H_2$/ethylene (% mol/mol) | 0.03 | <0.03 | 0.06 | 0.03 |
| Catalytic solid (g/h) | 5.6 | 5.6 | 10.2 | 10.2 |
| Temperature (° C.) | 80 | 80 | 80 | 80 |
| Residence time (h) | 1.25 | 1.2 | 1.28 | 1.31 |
| Outgoing ethylene (mol %) | 12.2 | 16.7 | 7.1 | 12.6 |

EXAMPLE 11R

The operations of example 10 were repeated but without the CHEMAX® X-997 feed, but with the catalyst and hydrogen feed unchanged. The ethylene content in the gas leaving the reactor was 16.7 mol %.

Comparing example 10 with example 11R demonstrates that the addition of an antistatic agent makes it possible to obtain a better conversion of the ethylene (less ethylene in the gas leaving the reactor), hence a higher catalytic efficiency.

EXAMPLE 12

The operations of example 10 were repeated, but using the STADIS® 450 from Octel in an amount of 0.33 g/h instead of the CHEMAX® X-997. The ethylene content in the gas leaving the reactor was 7.1 mol %.

EXAMPLE 13R

The operations of example 12 were repeated, but without the STADIS® 450 feed but with the catalyst and hydrogen feed unchanged. The ethylene content in the gas leaving the reactor was 12.6 mol %.

Comparing example 12 with example 13R demonstrates that the addition of an antistatic agent makes it possible to obtain a better conversion of ethylene (less ethylene in the gas leaving the reactor), hence a higher catalytic efficiency.

What is claimed is:

1. A process for manufacturing ethylene homopolymers or ethylene copolymers comprising at least 90 mol % of units derived from ethylene, in which process ethylene, and optionally other monomers, are brought into contact, under polymerizing conditions, with a catalytic system comprising:
   (a) a catalytic solid comprising a metallocene of a transition metal of Groups 4 to 6 of the Periodic Table, which contains at least one cyclopentadiene ligand, which may be substituted, deposited on a support;
   (b) at least one organoaluminum compound chosen from compounds satisfying the general formula (1)

$$AlT_x(Y')_yX'_z \qquad (1)$$

in which:
   T is a hydrocarbon group containing from 1 to 30 carbon atoms,
   Y' is a group chosen from —OR', —SR' and NR'R", where R' and R" represent, independently, a hydrocarbon group containing from 1 to 30 carbon atoms,
   X' is a halogen atom,
   x is a number satisfying the condition $0<x \leq 3$,
   y is a number satisfying the condition $0 \leq y<3$,
   z is a number satisfying the conditions $0 \leq z<3$ and $x+y+z=3$; and
   (c) at least one ionic antistatic agent selected from the group consisting of quaternary ammonium represented by the general formula $A^1A^2A^3A^4NX^1$, in which $A^1$, $A^2$, $A^3$ and $A^4$ represent, independently, a hydrocarbon group containing from 1 to 35 carbon atoms and a least one of $A^1$, $A^2$, $A^3$ and $A^4$ is a hydrocarbon group containing from 6 to 35 carbon atoms, and $X^1$ is a halogen atom and sulfonic acids having at least one unsubstituted or substitute hydrocarbon group containing from 16 to 35 carbon atoms.

2. The process as claimed in claim 1, in which the metallocene is chosen from compounds satisfying the formula

$$Q_a(C_5H_{5-d-b}R^1{}_b)(C_5H_{5-d-c})\,R^2{}_c)MeXY \qquad (2)$$

in which:

Q represents a divalent linking group between the two cyclopentadiene ligands $(C_5H_{5-d-b}R^1_b)$ and $(C_5H_{5-d-c}R^2_c)$;

a equals 0 or 1;

b, c and d are integers satisfying the conditions $0 \leq b \leq 5$, $0 \leq c \leq 5$ and $0 \leq d \leq 5$ when a equals 0, and $0 \leq b \leq 4$, $0 \leq c \leq 4$ and $0 \leq d \leq 4$ when a equals 1;

$R^1$ and $R^2$ each represent hydrocarbon groups containing from 1 to 20 carbon atoms and able to be linked to the cyclopentadiene ligand in the form of a monovalent group or able to be connected to each other so as to form a ring adjacent to the cyclopentadiene ligand, halogen atoms, alkoxy groups having from 1 to 12 carbon atoms, silicon-containing hydrocarbon groups of formula —Si$(R^4)(R^5)(R^6)$, phosphorus-containing hydrocarbon groups of formula —P$(R^4)(R^5)$, nitrogen-containing hydrocarbon groups of formula —N$(R^4)(R^5)$ or boron-containing hydrocarbon groups of formula —B$(R^4)(R^5)$ in which $R^4$, $R^5$ and $R^6$ represent hydrocarbon groups containing from 1 to 24 carbon atoms, as long as when b, c or d equals 2 or more and/or a plurality of groups $R^1$ or $R^2$ exist, the latter may be identical or different;

Me represents a transition metal of Groups 4 to 6 of the Periodic Table; and

X and Y, which are identical or different, each represent a hydrogen atom, a halogen atom, a hydrocarbon group, an alkoxy group, an amino group, a phosphorus-containing hydrocarbon group or a silicon-containing hydrocarbon group having from 1 to 20 carbon atoms.

3. The process as claimed in claim 1 or 2, in which the catalytic solid (a) furthermore contains an activator.

4. The process as claimed in any one of claim 1, in which the support is a silica.

5. The process as claimed in any one of claim 1, in which the organoaluminum compound (b) is chosen from among trialkylaluminums of formula $AlT_3$ in which each T represents an alkyl group comprising from 1 to 6 carbon atoms.

6. The process as claimed in claim 1, in which the ionic antistatic agent (c) is dicocoalkyldimethylammonium chloride.

7. The process as claimed in claim 1, in which the ionic antistatic agent (c) is dinonylnaphthalenesulfonic acid.

8. The process as claimed in any one of claim 1, in which the molar ratio of the antistatic agent (c) to the organoaluminum compound (b) is less than 0.5.

* * * * *